United States Patent [19]
Hansen

[11] 3,901,071
[45] Aug. 26, 1975

[54] ULTRASONIC THICKNESS GAUGE
[75] Inventor: Earl N. Hansen, Melrose, Mass.
[73] Assignee: LFE Corporation, Waltham, Mass.
[22] Filed: Sept. 25, 1973
[21] Appl. No.: 400,524

[52] U.S. Cl. ............................. 73/67.8 S; 73/67.9
[51] Int. Cl. ........................................... G01b 17/02
[58] Field of Search ........................ 73/67.9, 67.8 S

[56] References Cited
UNITED STATES PATENTS
| | | | |
|---|---|---|---|
| 3,228,233 | 1/1966 | Keldenich | 73/67.8 S |
| 3,605,504 | 9/1971 | Kummer, Jr. et al. | 73/67.9 X |
| 3,624,712 | 11/1971 | Weighart | 73/67.9 |
| 3,808,879 | 5/1974 | Rogers | 73/67.9 |
| 3,827,287 | 8/1974 | Boggs et al. | 73/67.8 S |

*Primary Examiner*—Charles A. Ruehl
*Attorney, Agent, or Firm*—Richard J. Donahue

[57] ABSTRACT

Ultrasonic probes are positioned around the circumference of a pipe to monitor the pipe thickness by the time interval between echoes from the outer and inner surfaces of the pipe. A multiplexing system operates the probes sequentially and a signal averaging circuit provides a signal indicative of the average pipe thickness which may be used in a control loop to maintain constant average pipe thickness in a pipe extrusion system.

7 Claims, 8 Drawing Figures

ULTRASONIC THICKNESS GAUGE

BACKGROUND OF THE INVENTION

1. Field of the Invention

The present invention is related to ultrasonic thickness gauges and in particular to such gauges utilized for monitoring thickness of extruded pipe.

2. Description of the Prior Art

Ultrasonics has been used extensively to inspect both metal and plastic pipe for flaws. It has also been used to an extent to measure the thickness of pipes. In extruding plastic pipe, hot plastic is forced through a die to form it into pipe shape and then passed immediately into a cooling liquid bath or spray so as to quickly reduce its plasticity. It is common to apply tension at a point spaced some distance from the extrusion die. The amount of tension determines stretching of the hot plastic as it leaves the die thereby determining wall thickness.

Most ultrasonic gauges used in pipe extruding check for flaws or for thickness deviation beyond limits. They are not well suited for a control loop since an extrusion control loop must be responsive to average thickness. The wall thickness along one side of an extruded pipe may vary within tolerance limits without an average change in pipe thickness. Thus, to control the extrusion process from one side only could lead to undesirable thickness variations in other parts of the pipe circumference.

In introducing additional ultrasonic probes so as to obtain an average pipe thickness, calibration problems arise since the probes must be accurately positioned as a group.

SUMMARY OF THE INVENTION

In accordance with the invention a system has at least three ultrasonic probes which are secured to a frame positioned about a pipe to be measured. A digital display is utilized together with a selector to display the response from a specific probe or the average of all the probes. A multiplexer drives the probes sequentially for signal averaging purposes. An adjustable window enables the receiver only during the time interval of desired echoes and an AGC system in the receiver maintains constant amplitude of the pipe interface echo returns.

An indicator light, driven by the automatic gain control circuitry, operates as a signal for accurately positioning the probes normal to the pipe surface.

The invention further includes a system in which the average signal is provided through a controller for a tensioning device used in conjunction with a plastic pipe extruder to control average pipe thickness during production. Thus, it is an object of the invention to provide a novel ultrasonic thickness gauge;

It is a further object of the invention to provide a thickness gauge in which a plurality of ultrasonic probes are sampled and averaged to monitor average thickness of a pipe;

Further objects and features of the invention will become apparent upon reading the following description together with the drawing.

DESCRIPTION OF THE PREFERRED EMBODIMENT

The ultrasonic thickness gauge according to the invention has been designed for flexibility. One of the required capabilities is averaging of thickness around the circumference of a pipe and to do this without the complication of mechanical rotation requires at least three ultrasonic probes. In accordance with the preferred embodiment described herein, provision is made for five probes, four probes being available for being spaced at 90° intervals around the circumference of the pipe, and the fifth, if desired, for additional monitoring, for example, at a displaced position along the pipe length. In its most usual application it is contemplated that four of the probes in the preferred embodiment will be secured in a frame submerged in a cooling liquid bath or spray at the output of a plastic pipe extruder so that the extruded pipe passes through the frame intermediate of the four probes. The liquid bath is well known with the pipe extrusion process and uses seals in frictional contact with the pipe so that the liquid is retained in the bath rather than passing out the openings through which the pipe passes.

Ultrasonic pulses from the probes produce strong echoes at interfaces of different media. Therefore, an echo is produced at the interface between the liquid bath and the outer surface of the pipe, and a further echo is produced in the interface between the inner surface of the pipe and a gas or liquid media inside the pipe. There are also echoes due to reverberation between interfaces. In order to minimize the effects of undesired echoes, the present invention gates the output of the receiver with a window which passes signals only during the time interval in which the desired echoes would appear. Multiplexing enables the use of a single receiver and signal processing channel with a plurality of probes.

Figure 1:
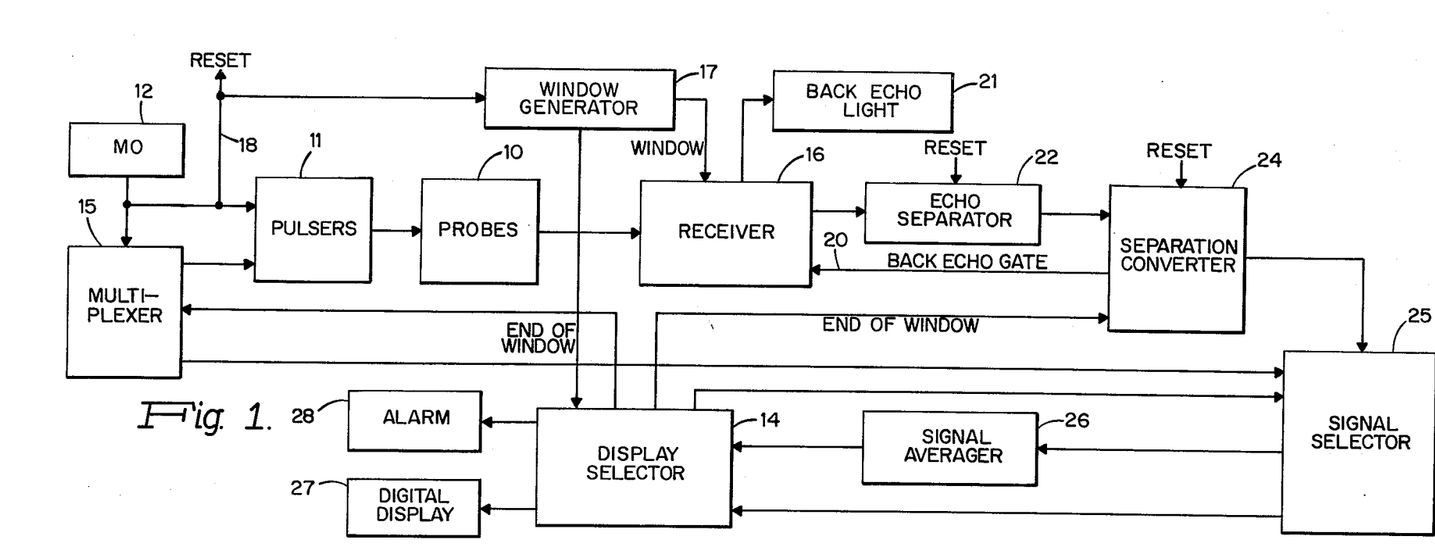
FIG. 1 is an overall block diagram of a thickness gauge according to the invention.

A simplified block diagram of the ultrasonic thickness gauge is depicted in FIG. 1. The ultrasonic probes 10 provide focused directional ultrasonic pulses in response to pulsers 11, the pulsing of which is initiated by master oscillator 12. Depending upon the position of display selector 14, which may be a rotary multiwafer switch, either a selected pulser of pulsers 11 pulses a respective single probe of probes 10 or else, in a signal averaging mode, multiplexer 15 enables the individual pulsers of pulsers 11 in a repeating sequence driving the respective probes 10 sequentially. Probes 10 also operate in a receive mode to detect ultrasonic waves and provide detected signals to receiver 16.

At least the output portion of receiver 16 is gated by a window to enable the receiver output only during the time interval of desired echoes. Window generator 17 provides the desired gating function and is not described in detail since it is of a conventional configuration. Each output pulse on line 18 from master oscillator 12 is connected to window generator 17. Window generator 17 suitably is made up of a signal delay device and a monostable multivibrator which is set at the end of the delay period and resets itself at the end of an interval determined by storage elements in the multivibrator. Both the delay device and monostable multivibrator are preferably variable to accommodate different velocities in different media, different nominal thicknesses of the material to be measured, and different spacings between the probes and the material to be measured.

Receiver 16 also contains an AGC circuit. Since the echo from the front interface of a layer being measured is generally much stronger than the echo from the back interface, the AGC circuit is depicted as responsive to the back interface echo only. Thus a back echo gate 20 is provided so that automatic gain control of receiver 16 is responsive only to back echoes. Connected to the AGC circuit is a back echo light 21 which is illuminated by the presence of back echoes. Operation of the AGC acts to stabilize the intensity of back echo light 21. However, as will be described, an AGC off switch enables the use of the back echo light in positioning the probes. Light 21 will be at maximum intensity when the probes are accurately aligned normal to the surface of the layer to be gauged. Occasions have arisen where other echoes than the back echo are better suited for AGC purposes. The apparatus of the present invention is readily adapted to gate other echoes for AGC purposes in which case they can equally serve for probe alignment.

The output of receiver 16 is connected to echo separator 22 which has the function of separating the front interface and back interface echoes. It may also be used to additionally separate out further reverberation echoes since in some systems, it is preferable to ignore the first interface echo and operate on second and third echoes or other combinations of echoes. The output of echo separator 22 is connected to separation converter 24 which has the function of selecting the particular two echoes desired, providing a voltage analog of the time interval between the two echoes and also providing back echo gate 20 commencing after the first of the two selected echoes and terminating an equal time after the second selected echo. The output of separation converter 24 is a sample and hold circuit which holds the analog voltage until a new analog voltage is received. Reset signals from master oscillator 12 are applied to both echo separator 22 and to separation converter 24. Echo separator 22 contains flip-flops which are set by their respective echoes and which must be reset prior to receiving new echoes. Separation converter 24 includes a circuit for providing a voltage analog of the time between selected echoes which must also be reset to zero. Separation converter 24 also has a connection via display selector 14 from window generator 17 providing a signal at the end of the window. This connection is switched to be effective only during signal averaging and functions to require the sample and hold circuit to sample following the end of each window this actually providing a zero output signal in the absence of an input from echo separator 22.

The output of separation converter 24 is connected to signal selector 25. Signal selector 25 provides the appropriate analog voltage signals to signal averager 26 responsive to signals from multiplexer 15 for averaging. Or, for different positions of display selector 14, it transfers the analog voltage at the sample and hold circuit of separation converter 24 to digital display 27. Digital display 27 is suitably a digital voltmeter calibrated in material thicknesses rather than in volts. Averager 26 is a conventional averaging circuit which accepts the sampled voltage analogs of the echo separations from the four probes and divides the sum by four to provide an output average analog voltage. The output of averager 26 is connected to display selector 14 which transfers it to digital display 27. Display selector 14 may also connect the selected signal to an alarm circuit 28 to provide visual and/or aural alarm upon receipt of voltages indicating thickness variations above or below tolerance.

Figure 2:
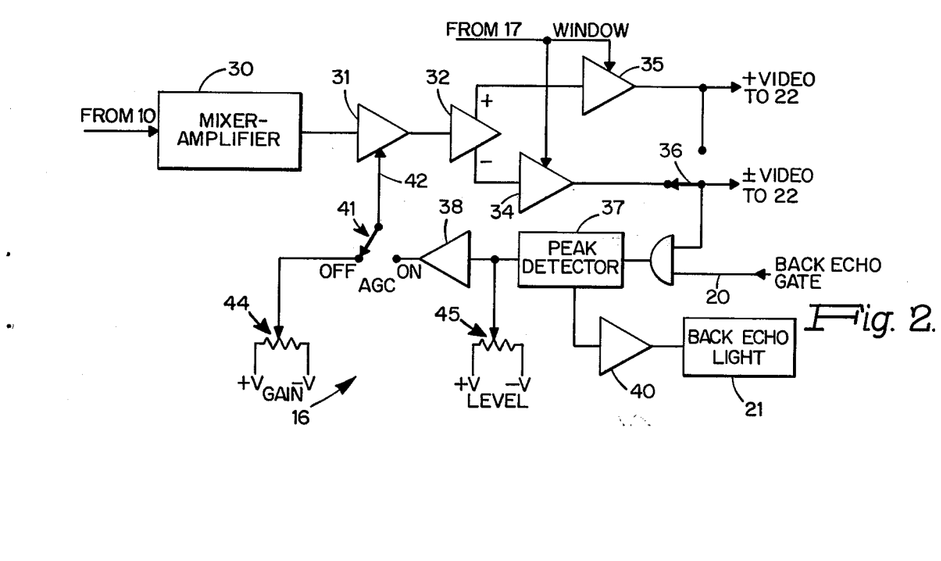
FIG. 2 is a detailed block diagram of the receiver and back echo light of FIG. 1.

While most of the circuitry for the present ultrasonic gauge will be obvious to those skilled in the art, certain parts will be better understood upon description in further detail. Thus, FIG. 2 is a further detailed description of receiver 16 in simplified diagramatic form. The output of probes 10 is combined in a mixer-amplifier 30. Mixer-amplifier 30 is connected to a second amplifier 31 which in turn is connected to an amplifier 32 having separate outputs of inverted and noninverted phase. The inverted output of amplifier 32, indicated by a minus sign, is connected to gated amplifier 34. The noninverted output of amplifier 32 indicated by a plus sign is connected to gated amplifier 35. The gate inputs of amplifiers 34 and 35 are connected to window generator 17 so as to gate amplifiers 34 and 35 on only during the window interval. Receiver 16 has two outputs, one labeled *plus video* is the output of amplifier 35, the second labeled *plus or minus video* is switchable by a switch 36 to be either the output of amplifier 34 as shown or a parallel output of amplifier 35. The reason for this arrangement is that in measuring a plastic pipe, the back interface echo is normally reversed in phase from the front interface echo and since the circuitry following the receiver is most readily made responsive to a single polarity, it is desirable to have an inverted signal representative of the back echo to minimize separation error. Since in some types of measurement the phase inversion will not exist, provision is made to connect the plus video output to both output connections. The plus or minus video output is also connected to an AND gate by the back echo gate from separation converter 24. This connects the back echo signal, whether it be from amplifier 34 or amplifier 35, to a peak detector 37. The output of peak detector 37 is connected both to an AGC amplifier 38 and to back echo light amplifier 40. Back echo light amplifier 40 provides a signal proportional to the peak of the back echo to back echo light 21. AGC amplifier 38 is connectable by AGC switch 41 to gain controlling input 42 of amplifier 31. The gain of amplifier 31 is controlled by manual gain control 44 when switch 41 is off, and by the combination of the AGC signal and the AGC level input 45 to amplifier 38 when switch 41 is on.

It will be seen that the sensitivity of light 21 to the back echoes from probes 10 is much greater with the AGC off. Also with the AGC off, gain control 44 will vary the intensity of light 21.

Figure 3:
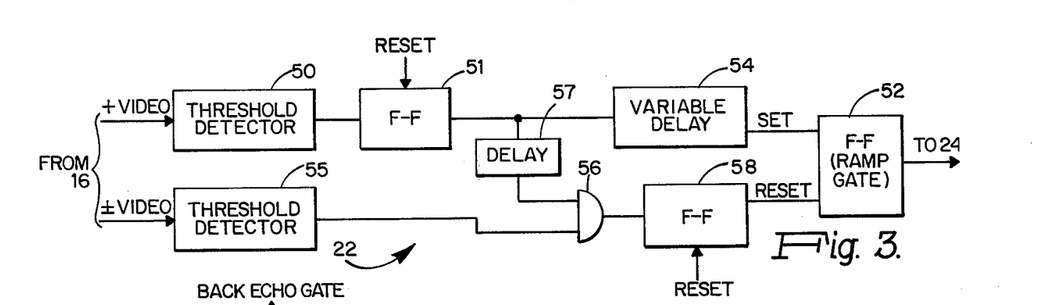
FIG. 3 is a detailed block diagram of the echo separator of FIG. 1.

The echo separator is described in greater detail in FIG. 3. The echo separator detects the echoes, changes them to logic level signals, and separates them into separate output signals. While it has been stated that there are more than two echoes that may be separated out and used to derive thickness information, the illustrated embodiment operates only on the front interface and back interface echoes. Echo separator 22 receives the signal output of receiver 16 on two separate lines as either plus video and minus video or plus plus video depending on the position of switch 36. The plus video line connects to threshold detector 50 which has the purpose of distinguishing echoes from extraneous noise. The output of threshold detector 50 is connected to first flip-flop 51 as a set input. Flip-flop 51 also has a reset input from master oscillator 12. Flip-flop 51 is connected to the set input of third flip-flop 52 through a variable delay 54.

The plus or minus video is connected to a second threshold detector 55, the output of which is connected to AND gate 56. The other input of AND gate 56 is connected from the output of flip-flop 51 via delay 57. The output of AND gate 56 is connected to second flip-flop 58 as a set input.

The delayed output connection from flip-flop 51 to AND gate 56 insures that flip-flop 58 will not respond to the front interface echo, but only to the following echo, i.e., the back interface echo. Flip-flop 58 also has its reset input connected from master oscillator 12. The output of flip-flop 58 is connected as the reset input of flip-flop 52. Thus, flip-flop 52 is set by the front interface echo and reset by the back interface echo providing an output rectangular wave shape of a length corresponding to the time interval between the two echoes and thus proportional to the thickness of the material gauged. Variable delay 54 is provided for calibration purposes to correct for errors due to polarity of the sensed waveforms when necessary.

Separation converter 24 (FIG. 4) converts the length of the output wave of flip-flop 52 into an analog voltage. For this purpose, the output of flip-flop 52 is connected to current switch 60 as a switch control signal. Current switch 60 connects constant current source 61 to ramp circuit 62. Constant current source 61 may be varied by slope control 64 to change the amplitude of the constant current. A change in the amplitude of the current produces a corresponding change in the slope of the ramp obtained by ramp circuit 62. Ramp circuit 62 is suitably an operational amplifier connected to provide a linear charging rate to a feedback capacitor 65 thus producing a linear ramp at its output.

Figure 4:
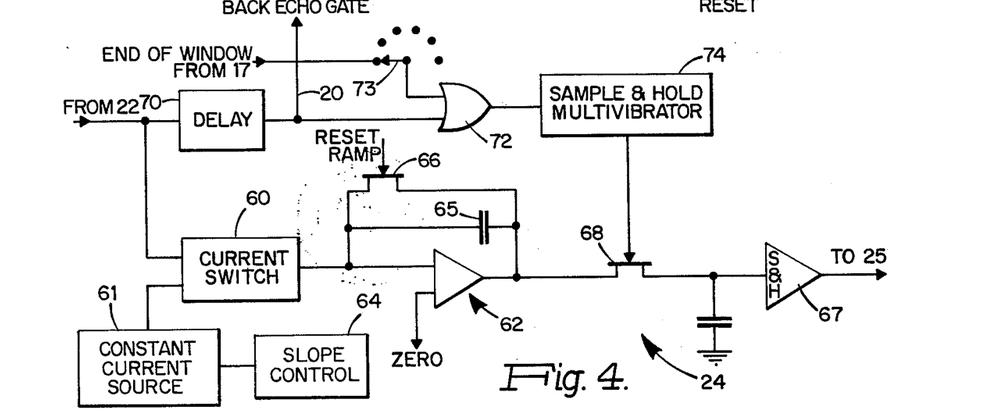
FIG. 4 is a detailed block diagram of the separation converter of FIG. 1.

Semiconductor switch 66 connected across feedback capacitor 65 is switched into conduction at each cycle of master oscillator 12 by connection to the reset output of master oscillator 12. The ramp voltage on capacitor 65 is lost upon reset unless it has been transferred to sample and hold amplifier 67 by semiconductor switch 68 prior to reset. Thus, the output of ramp circuit 62 is connected to semiconductor switch 68 which in turn is connected to sample and hold amplifier 67.

The input to separation converter 24 from echo separator 22 is also connected to delay circuit 70. The output of delay circuit 70 provides the back echo gate 20 and also an input to OR gate 72. Back echo gate 20 is connected to receiver 16 to gate the AGC circuit.

Delay 70 insures that the back echo gate commences after the termination of the first echo and terminates after at least the first portion of the second echo. The delayed output of flip-flop 52 is connected through OR circuit 72 to multivibrator 74 which is connected as the switching input to semiconductor switch 68. Thus, for every rectangular output waveform from flip-flop 52, a ramp voltage will be generated and transferred under control of multivibrator 74 to sample and hold circuit 67. In the absence of an input from flip-flop 52, ramp generator 62 will reset to zero, but the zero will not be transferred to sample and hold 67, and sample and hold 67 will retain the last sample received.

While this operation is satisfactory during observation of one probe only, during an averaging operation, it can lead to false information. Thus, during the average operation mode, a second input to OR gate 72 is provided from window generator 17 at the end of the window gate. Thus, in the averaging mode, the voltage at ramp generator 62 will be transferred to sample and hold 67 even if it is a zero voltage.

Figure 5:
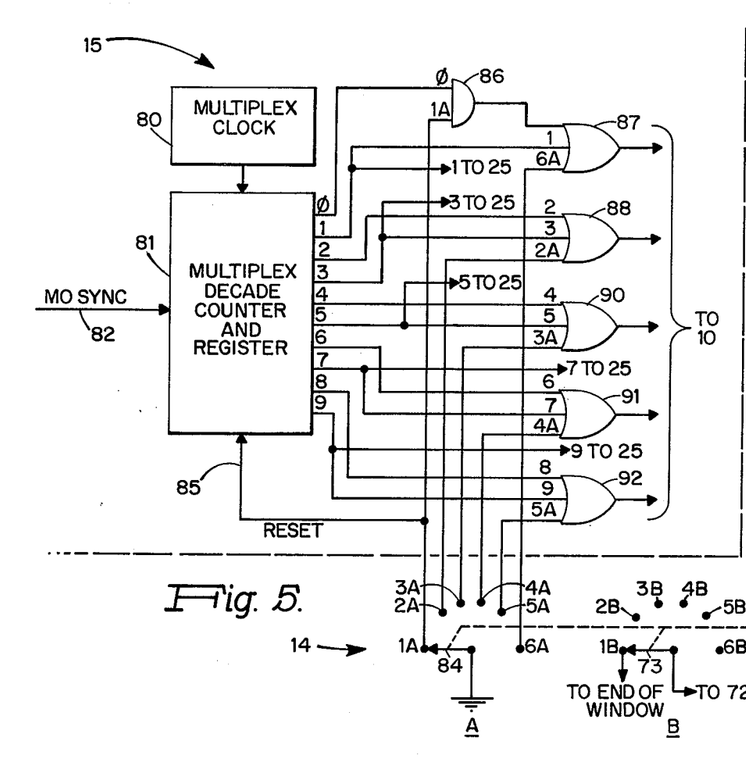
FIG. 5 is a detailed block diagram showing the multiplexer, signal selector and display selector of FIG. 1.

Display selector 14 controls the operation of multiplexer 15 and signal selector 25. Thus, FIG. 5 shows all three of these blocks in some detail in order to depict the interconnections. Multiplexer 15 is made up of a multiplex clock 80 which drives a decade counter with a decimal output register 81. The output of clock 80 to counter and register 81 is much slower than the master oscillator rate so that in the multiplex mode, a number of pulses are provided during each position of the multiplex register. A synchronizing input 82 from master oscillator 12 to counter and register 81 insures that the operation of counter and register 81 is consistent with the master oscillator cycling.

Referring now to display selector 14, it will be seen that selector 14 is depicted as a stacked four wafer rotary switch with the wafers designated A, B, C and D. Wafer A interconnects with multiplexer 15. It has its moving contact 84 connected to ground. Fixed contact 1A provides the multiplex averaging function. By grounding the reset input 85 of counter and register 81 it enables the counter. When moving contact 84 is in any other position, reset input 85 is floating and causes the counter and hence the register to reset at zero. The $\phi$ register output is connected to AND gate 86 only and since operation of AND gate 86 requires contact 84 to be switched to position 1A, the $\phi$ register output is ineffective except in the averaging mode. Multiplexer 15 includes five OR gates 87, 88, 90, 91 and 92. Each OR gate has an input from wafer A of display selector 14. Thus, an input to OR gate 87 is contact 6A, to gate 88 is contact 2A, to gate 90 is contact 3A, to gate 91 is contact 4A, and to gate 92 is contact 5A so that an OR gate is enabled by each position of display selector 14 except the first or average position. OR gate 87 is connected to control an auxiliary pulser and may be multiplexed in order to obtain a separate gauge output during averaging. Since the display in the described embodiment is connected to the average output during multiplexing, the auxiliary probe when multiplexed would have to be read by a separate display not included in the present description.

OR gate 87 has an input from the 1 register output and also an input from AND gate 86. In the averaging position of selector 14, AND gate 86 transfers the $\phi$ register output to OR gate 87. Thus, there would be an output from OR gate 87 when the register of counter and register 81 is in either the $\phi$ or 1 positions. OR gate 88 has inputs from positions 2 and 3 of the register, OR gate 90 from positions 4 and 5 of the register, OR gate 91 from positions 6 and 7 of the register, and OR gate 92 from positions 8 and 9 of the register. The outputs of OR gates 87, 88, 90, 91 and 92 may conveniently be connected to AND gates (not shown) together with an input from master oscillator 12. The outputs of the AND gates (not shown) would then enable respective pulsers 11. These latter details are not illustrated since they are within the skill of the art. When a master oscillator pulse is passed by an AND gate to a respective pulser, the pulser releases a drive pulse driving a respective probe of probes 10 all in conventional manner. It will be understood that the drive pulse may be a burst at ultrasonic frequencies, a direct current pulse, or other drive pulse required by the nature of the specific transducer to produce the desired ultrasonic pulses.

Wafer B of selector 14 has operative connections only in the averaging position where it connects the end of window output of window generator 17 to OR gate 72 of separation converter 24. Wafer C of selector 14 is connected to five additional OR gates in signal selector 25. Fixed contact 2C is connected to OR gate 101, contact 3C is connected to OR gate 102, contact 4C is connected to OR gate 103, contact 5C is connected to OR gate 104 and contact 6C is connected to OR gate 105. OR gates 101 through 105 also each have an input from counter and register 81. The register position 3 is connected to gate 101, register position 5 is connected to gate 102, register position 7 is connected to gate 103, register position 9 is connected to gate 104, and register position 1 is connected to gate 105. OR gates 101 through 105 are connected to respective solid state switches 106, 107, 108, 109, and 110 as the switching inputs. The switched input to switches 106 through 110 is connected from sample and hold circuit 67 while the output of switches 106 through 110 is connected to respective sample and hold amplifiers 111, 112, 113, 114 and 115. Amplifiers 111 through 114 are each connected to averager 26. Wafer D of selector 14 has its moving contact connected to digital display 27 and its first fixed contact 1D connected to the output of averager 26. The outputs of sample and hold amplifiers 111 through 115 are additionally connected to fixed contacts 2D through 6D respectively of switch wafer D.

Operation will be best understood by considering operation of a single probe and then the averaging operation with multiplexing. Assuming that display selector 14 is switched to position 2, then counter and register 81 will be set to zero and held there while OR gate 88 will be enabled. Pulses from master oscillator 12 operating suitably at a 300 pulse per second rate will be connected to operate one of five pulsers 11 driving one of five probes 10. The output of the driven probe will be amplified by mixer-amplifier 30 and by further amplifiers 31 and 32. Only the portion of the output of amplifier 32 occurring during a window provided by window generator 17 will be passed by amplifiers 34 and 35.

Figure 6:
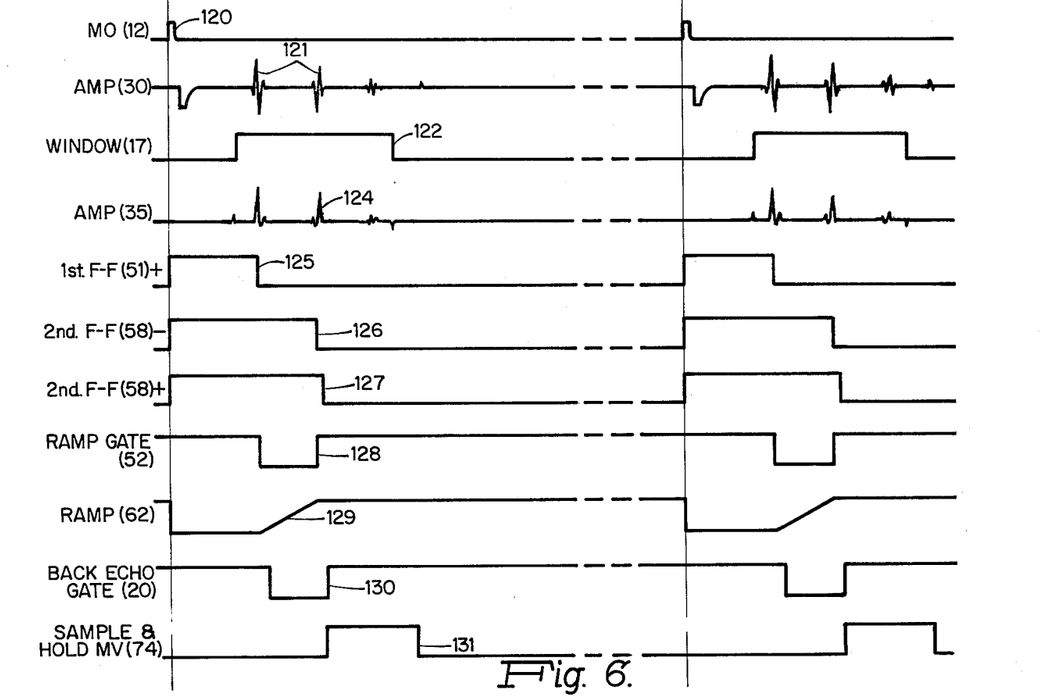
FIG. 6 is a timing chart showing the timing waveforms of the gauge of FIG. 1 in graphical form.

Reference is now made to the timing chart, FIG. 6, which shows the master oscillator pulses 120 and the output of mixer-amplifier 30 showing a series of echoes 121. Note that the second echo is inverted in phase from the first echo. A window from window generator 17 is depicted by rectangular wave 122 which may conventionally be provided by a monostable multivibrator that is adjustable to cover only the desired echoes. While the timing chart depicts a window from window generator 17 passing three echoes, in the embodiment specifically described it is desirably shortened to cover only the first two echoes. The output of amplifier 35 is depicted by waveform 124 showing slight deflections at the commencement and termination of window 122, the echoes occurring during the window and everything else cut off. Since amplifiers 34 and 35 are unipolar, waveform 124 has negligible components below the base line.

First flip-flop 51, reset by pulse 120, is set again by the positive going spike of the first echo depicted in waveform 124. Second flip-flop 58 is reset by master oscillator pulse 120 and set by the positive going wavefront from amplifier 34 representing the first negative swing of the second echo pulse depicted in waveform 121. Thus, the output of flip-flop 58 is depicted by waveform 126. When flip-flop 58 is connected to be responsive to the plus video output from amplifier 35, it is not set until the positive going part of the second echo, depicted in waveform 121, producing a longer reset interval as depicted by waveform 127. Third flip-flop 52 is set by the set output of flip-flop 51 and is reset by the set output of flip-flop 58 as depicted in waveform 126, thus providing a ramp gate 128 at the output of flip-flop 52 having a length determined by the interval between setting of flip-flop 51 and setting of flip-flop 58. Ramp circuit 62, reset by pulse 120, charges capacitor 65 during ramp gate 128 as shown by waveform 129. Ramp gate 128 delayed by delay 70 provides back echo gate 20 depicted by waveform 130. The ramp gate also triggers multivibrator 74 after the delay interval providing waveform 131. Waveform 131 drives switch 68 to connect the voltage on capacitor 65 to sample and hold circuit 67. Switch wafer C gates circuit 67 to sample and hold amplifier 111 and switch wafer D connects amplifier 111 to digital display meter 27.

With display selector 14 in the first position, wafer A of the selector switch grounds lead 85 enabling counter and register 81; wafer B supplies an end of window pulse from window generator 17 to OR gate 72 of separation converter 24; wafer C has no connection; and wafer D connects the output of averager 26 to display 27 and alarm 28. Multiplex clock 80 suitably has a six pulse per second rate while master oscillator 12 has a 300 pulse per second rate. The register output of counter and register 81 increases by one count for each pulse from clock 80. A first probe is enabled during both the zero and one counts of counter and register 81. Since this first probe in the described embodiment is the auxiliary probe, the operation will be described during enabling of the second probe while counter and register 81 is at register positions 2 and 3. During this time there are 100 pulses from master oscillator 12.

The first 50 pulses are connected to drive the respective pulser of pulsers 11 and probe of probes 10 with all of the circuitry being enabled up to signal selector 25. However, the respective OR gate 101 has no enabling signal during the first 50 pulses, but only during the second 50 pulses when the register output of counter and register 81 is at 3. Thus, the first 49 pulses serve only to stabilize the automatic gain in receiver 16. It will be understood that the automatic circuit will tend to produce maximum gain at the first echo from a specific probe and will require a series of echoes before stabilizing. At the 51st pulse the next pulse from clock 80 switches counter and register 81 to register output 3 enabling switch 106. Switch 106 transfers the analog voltage in sample and hold circuit 67 resulting from the 50th pulse to averager 26. Switch 106 is then inhibited by an RC circuit (not shown) with a time constant long enough to prevent further transfers during register output 3. At the end of the 100 pulses of master oscillator 12, sample and hold amplifier 111 will hold the voltage representative of the signal received from the 50th pulse only. Counter and register 81 then shifts to register output 4 enabling the next probe for 100 master oscillator pulses and the system continues through all five probes. At the time that counter and register 81 returns to register position zero, the signal representative of the echoes from each of the four averaged probes is present at the input of averager 26 which adds the four voltages and divides by four to provide a display voltage. Each of sample and hold amplifiers 111 through 114 maintains its voltage input to averager 26 until it receives a new input by operation of counter and register 81 reaching the respective one of counts 3, 5, 7 and 9.

It will be seen from the drawing and description that the output from each of probes 10 is connected by mixer-amplifier 30 to a single receiver channel operating for all probes. The outputs representative of the different respective probes are then selected by OR gates 101 through 105 either by an output from counter and register 81 during multiplexing or by wafer C of display selector 14 in the absence of multiplexing. Receiver 16, echo separator 22 and separation converter 24 all operate the same during multiplexing as when a single probe is selected by display selector 14 with one exception in separation converter 24. That is, the resampling by sample hold circuit 67 at the end of each window from window generator 17 irrespective of whether a ramp voltage has been generated.

Figure 7:
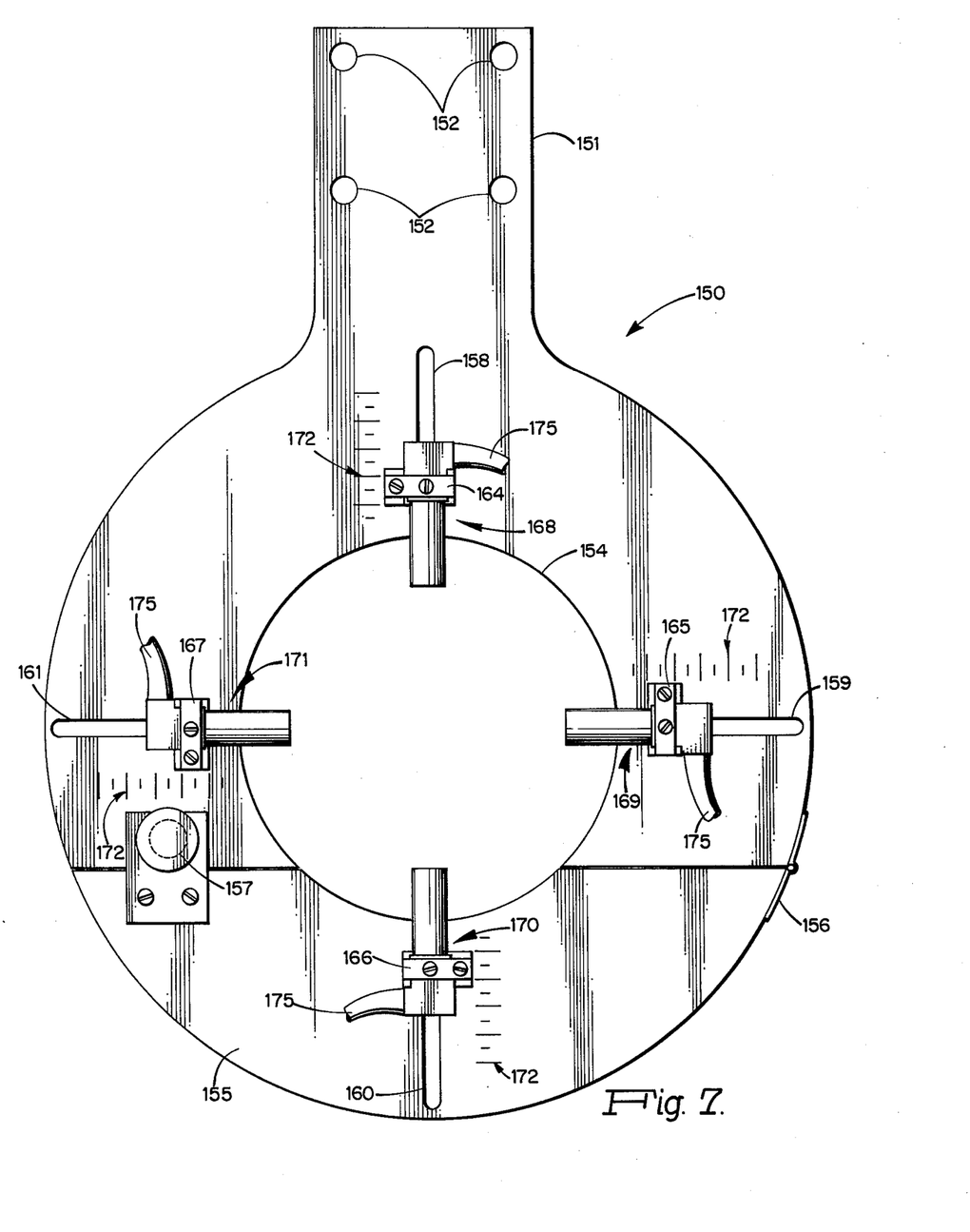
FIG. 7 is a front elevation of a supporting frame securing the ultrasonic probes of FIG. 1.

A frame for supporting four ultrasonic probes precisely positioned about the circumference of a pipe is depicted in FIG. 7. The frame, generally designated 150, is suitably made of sheet metal or plastic and has an upstanding portion 151 with apertures 152 for mounting bolts or other fastening means by which it can be mounted to a supporting structure. The supporting structure may, for example, be a bracket secured to a bath tank at the output of a pipe extruder. The lower main portion of frame 150 has a large central aperture 154 through which extruded pipe can pass.

In order to be able to install and remove the frame about pipe already in position, a lower portion 155 of frame 150 is connected to the rest of the frame by hinge 156 at one side and screw fastening means 157 at the other side. Screw fastening means may be used at both sides. Hinge 156 is conveniently secured to frame 150 by welding or by screws. Fastening means 157 is conveniently a small rectangular plate permanently affixed to portion 155 of frame 150 and securable to the upper portion of frame 150 by a screw having a knurled knob which screws into a hole threaded in the frame. Four slots 158, 159, 160 and 161 extending normal to central aperture 154 are spaced around aperture 154 at 90° intervals. Brackets 164 through 167 are secured in each of slots 158 through 161 respectively by thumb screws on the reverse side of the frame (not shown). Each of brackets 164 through 167 has a clamping opening for securing ultrasonic probes 168 through 171 in position facing the center of aperture 154 with their axes normal to aperture 154. A calibration scale 172 is marked adjacent to each of slots 158 through 161 for positioning of probes 168 through 171. A signal cable 175 is connected from each probe to pulsers 11 and receiver 16.

In operation, frame 150 is installed around the pipe to be gauged and ultrasonic probes 168 through 171 are positioned with reference to scales 172 in accordance with calculations determined by the diameter of the pipe, the nominal thickness of the pipe, and the velocity of sound in the media between the transducers and outer surface of the pipe and within the pipe material itself. It has been found usually preferable to focus the probes on the inside surface of the pipe. Once probes 168 through 171 have been positioned relative to marked scales 172, the thickness gauge is energized, AGC switch 41 is switched off, and display selector 14 is switched to one of the horizontally-positioned probes. Gain control 44 is adjusted to provide a suitable illumination level at back echo light 21. Then frame 150 is adjusted manually up and down for maximum intensity of back echo light 21. This adjustment aligns the horizontally-positioned probes normal to the surface of the pipe. The display selector 14 is then switched to one of the vertically-positioned probes and the frame 150 is adjusted from side to side for maximum intensity of the back echo light 21.

Figure 8:
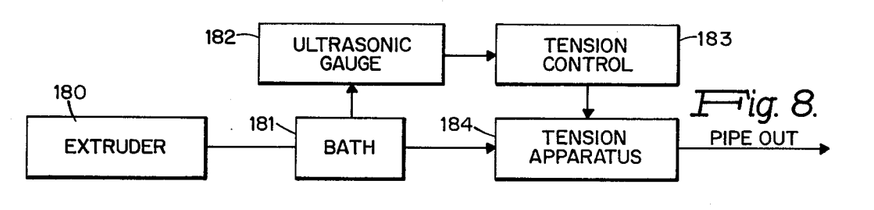
FIG. 8 is a block diagram of a pipe extrusion system utilizing the gauge of FIG. 1 as the controlling signal source in a closed loop control system.

The ultrasonic gauge according to the present invention is particularly suited for use as an error signal source in a closed loop control system applied to the manufacture of extruded plastic pipe. Thus, FIG. 8 depicts extruder 180 of a conventional type for the extrusion of plastic pipe followed by cooling bath tank 181. Ultrasonic gauge 182, as described in accordance with the invention, has a plurality of probes positioned around the pipe in bath tank 181 and derives a voltage analog of the average thickness around the circumference of the pipe. This voltage is applied to tension control 183 which operates to increase or decrease the tension applied by tension apparatus 184 as the output from gauge 182 indicates the average wall thickness is above or below a preset level. Those skilled in the art will understand that the effect of tension apparatus 184 is applied principally at the output of the extruder die between extruder 180 and bath 181 so that a complete closed loop system is effected. Tension control 183 is suitably a control unit of the type conventional in closed loop control systems, and tension apparatus 184 is a conventional component of plastic pipe extrusion apparatus. Accordingly, details of these blocks are not provided.

While the invention has been described with respect to a specific embodiment, a large number of variations are contemplated without departing from the scope of the invention. The number of probes are not considered critical, but at least three are desirable for worthwhile averaging of pipe thickness. Other types of multiplexing systems can be used to provide signal averaging and an analog display can be used as well as a digital one. Thus, it is intended to cover the invention within the scope of the following claims.

I claim:

1. Gauging apparatus for measuring material thickness ultrasonically comprising:

a. a plurality of at least three ultrasonic probes;

b. a like plurality of pulsers connected to excite the respective ones of said probes;

c. a single receiving channel connected to the mixed output of said probes for receiving the echoes from all of said probes;

d. a single echo separator connected to the output of said receiving channel for selecting front and back interface echoes;

e. a separation converter connected to the output of said echo separator for converting the time lapses between said front and back interface echoes to an analog voltage;

f. an averager with input connections representative of respective ones of said plurality of probes connected to the output of said separation converter for averaging the analog voltages derived from the echo separations of at least three of said plurality of ultrasonic probes;

g. multiplexing means for sequentially exciting said probes and sequentially transferring said analog voltages to the input of said averager; and h. single display means for indicating the average thickness of a material responsive to said analog voltages.

2. Gauging apparatus according to claim 1 wherein said receiving channel is provided with first and second signal outputs one of which may be inverted with respect to the other and said echo separator comprises detection means connected to said first signal output for detecting a front interface echo and detection means connected to said second signal output for detecting a back interface echo.

3. Gauging apparatus according to claim 1 wherein said separation converter comprises a ramp generator and means to initiate and terminate generation of a voltage ramp responsive to said echo separator.

4. Apparatus according to claim 1 in which said multiplexing means comprises a register having at least two sequentially-activated output terminals coupled to each of said pulsers only one of which terminals is connected to enable transfer of an analog voltage to the respective input of said averager.

5. Apparatus according to claim 1 wherein said display means is a digital display and further comprising an alarm to indicate deviations in excess of tolerance limits.

6. An ultrasonic thickness gauge comprising:

a. a plurality of ultrasonic probes;

b. means to pulse said probes;

c. a single automatic gain controlled receiver for amplifying echoes received by all of said probes;

d. means to detect the time intervals between received echoes from the respective probes;

e. means to convert said time intervals into respective analog voltages;

f. means to average said respective analog voltages; and, g. multiplexing means for sequencing the pulsing of said probes and simultaneously coupling the output of said means to convert to sequential inputs of said means to average.

7. An ultrasonic thickness gauge according to claim 6 wherein said multiplexing means has an output register with two consecutive counting terminals connected to enable pulsing of a respective probe during two consecutive counts and with only the second of said counting terminals connected to enable the output of said means to convert, whereby the gain of said receiver becomes stabilized before an output is applied to said means to average.

* * * * *